US009224367B2

(12) United States Patent
Utsuki

(10) Patent No.: US 9,224,367 B2
(45) Date of Patent: Dec. 29, 2015

(54) IMAGE PROCESSING APPARATUS, IMAGE PROCESSING METHOD, AND IMAGE PROCESSING PROGRAM

(75) Inventor: Shingo Utsuki, Kanagawa (JP)

(73) Assignee: Sony Corporation (JP)

( * ) Notice: Subject to any disclaimer, the term of this patent is extended or adjusted under 35 U.S.C. 154(b) by 991 days.

(21) Appl. No.: 12/932,748

(22) Filed: Mar. 3, 2011

(65) Prior Publication Data

US 2011/0234635 A1 Sep. 29, 2011

(30) Foreign Application Priority Data

Mar. 23, 2010 (JP) ................................ P2010-066384

(51) Int. Cl.
| | |
|---|---|
| *G06T 11/60* | (2006.01) |
| *G09G 5/00* | (2006.01) |
| *G06F 3/048* | (2013.01) |
| *G09G 5/34* | (2006.01) |
| *G06F 3/0485* | (2013.01) |

(52) U.S. Cl.
CPC ................ *G09G 5/34* (2013.01); *G06F 3/0485* (2013.01); *G06F 3/04855* (2013.01)

(58) Field of Classification Search
CPC ........................... G06F 3/0485; G06F 3/04855
See application file for complete search history.

(56) References Cited

U.S. PATENT DOCUMENTS

| 4,394,649 | A | * | 7/1983 | Suchoff et al. | ................. 345/168 |
|---|---|---|---|---|---|
| 6,259,432 | B1 | * | 7/2001 | Yamada et al. | ................ 345/159 |
| 2002/0135602 | A1 | * | 9/2002 | Davis et al. | .................... 345/684 |
| 2005/0091604 | A1 | * | 4/2005 | Davis | ............................ 715/772 |
| 2006/0290666 | A1 | * | 12/2006 | Crohas | ........................... 345/157 |
| 2008/0079972 | A1 | * | 4/2008 | Goodwin et al. | ............. 358/1.12 |
| 2009/0100373 | A1 | * | 4/2009 | Pixley et al. | ................... 715/786 |
| 2009/0219247 | A1 | * | 9/2009 | Watanabe et al. | ............. 345/157 |
| 2011/0185309 | A1 | * | 7/2011 | Challinor et al. | ............. 715/784 |

FOREIGN PATENT DOCUMENTS

| JP | 04-365097 A | 12/1992 |
|---|---|---|
| JP | 06-318206 A | 11/1994 |
| JP | 11-258977 A | 9/1999 |
| JP | 2005-223632 A | 8/2005 |

* cited by examiner

*Primary Examiner* — Tize Ma
(74) *Attorney, Agent, or Firm* — Lerner, David, Littenberg, Krumholz & Mentlik, LLP

(57) ABSTRACT

There is provided an image processing apparatus, an image processing method, and an image processing program realizing natural scroll display and high-speed scroll. The image processing apparatus includes: a detector detecting a scroll request; and a processor, when the detector detects a high-speed scroll request, employing a blurred picture created through a blurring process as a new picture required for a subsequent update of image displayed in a scroll region, thereby generating an image to be displayed.

13 Claims, 4 Drawing Sheets

IMAGE PROCESSING APPARATUS, IMAGE PROCESSING METHOD, AND IMAGE PROCESSING PROGRAM

CROSS-REFERENCE TO RELATED APPLICATION

The present application claims priority from Japanese Patent Application No. JP 2010-066384 filed in the Japanese Patent Office on Mar. 23, 2010, the entire content of which is incorporated herein by reference.

BACKGROUND OF THE INVENTION

1. Field of the Invention

The present invention relates to an image processing apparatus, an image processing method, and an image processing program for processing an image in scroll display.

2. Description of the Related Art

At the time of displaying all or a part of contents stored in a recording medium as a list on a screen, there is a case that all of the contents is not fit in the screen. In this case, the user generally displays the contents which are out of the screen by scrolling them on the screen. The user sends a scroll request to a display device by using a touch panel, a keyboard, a controller, or the like. When the request is detected by the display device, the contents out of the screen are displayed only by predetermined number of lines (for example, one line) on the screen. In the case where the user continuously sends the scroll request, for example, the contents displayed on the screen are scrolled up or down, and the scroll speed increases.

The scroll speed depends mainly on computation processing capability of the display device. In the case where the user displays contents on a screen via a network, the scroll speed depends not only on the computation processing capability of the display device but also largely on the communication speed. In the case where volume of contents desired to be displayed is extremely large, one of methods for the user to quickly reach contents to be retrieved is high-speed scroll. The high-speed scroll refers to scroll of contents to be displayed on the screen at high speed to the degree that the user cannot make out characters and images in a scroll region on the screen. In the case where the user desires to quickly reach contents to be retrieved, when a display device operated by the user does not have the high-speed scroll function or, although it has the function, provides only low-speed scroll, the commercial value of the display device may drop considerably. Consequently, various methods for realizing the high-speed scroll have been being proposed (for example, Japanese Unexamined Patent Application Publications No. 2005-223632, No. Hei 11-258977, No. Hei 6-318206, and No. Hei 4-365097).

SUMMARY OF THE INVENTION

In the methods disclosed in Japanese Unexamined Patent Application Publications No. 2005-223632, No. Hei 11-258977, No. Hei 6-318206, and No. Hei 4-365097, however, the scroll display may be unnatural, and the scroll speed may depend largely on the computation processing capability and the like. Consequently, the methods disclosed in Japanese Unexamined Patent Application Publications No. 2005-223632, No. Hei 11-258977, No. Hei 6-318206, and No. Hei 4-365097 do not fully satisfy the demand of the user at present for the scroll display and the high-speed scroll.

It is therefore desirable to provide an image processing apparatus, an image processing method, and an image processing program realizing natural scroll display and high-speed scroll.

An image processing apparatus according to an embodiment of the invention includes a detector detecting a scroll request, and a processor performing a process according to the scroll request detected by the detector. In the case where the detector detects a high-speed scroll request, the processor employs a blurred picture created through a blurring process as a new picture required for a subsequent update of image displayed in a scroll region, thereby generating an image to be displayed.

An image processing method according to an embodiment of the present invention includes detecting a scroll request; and employing, when a high-speed scroll request is detected, a blurred picture created through a blurring process as a new picture required for a subsequent update of image displayed in a scroll region, thereby generating an image to be displayed.

An image processing program as an embodiment of the invention allows a computer to perform procedures of: detecting a scroll request; and employing, when a high-speed scroll request is detected, a blurred picture created through a blurring process as a new picture required for a subsequent update of image displayed in a scroll region, thereby generating an image to be displayed.

In the image processing apparatus, the image processing method, and the image processing program as embodiments of the invention, in high-speed scroll mode, a blurred picture created through blurring process is employed as a new picture required for a subsequent update of image displayed in a scroll region. Consequently, as compared with the case where all of display images are made by images which are not subjected to the blurring process, a scroll speed (visual scroll speed) felt (confused) by the user becomes faster. In the high-speed scroll mode, the user cannot visually clearly make out the image which is not subjected to the blurring process and sees an image which is not subjected to the blurring process as a blurred picture. Therefore, for example, when the display image which is not subjected to the blurring process changes to the display image including the image subjected to the blurring process and, further, changes to the display image made only by the image subjected to the blurring process, the display image does not look unnatural. For example, on the contrary, also when the display image made only by the image subjected to the blurring process changes to the display image including the image which is subjected to the blurring process and, further, changes to the display image which is not subjected to the blurring process, the display image does not look unnatural. Rather, the transition from the low-speed scroll to the high-speed scroll and the transition from the high-speed scroll to the low-speed scroll look more natural. In addition, the realistic sensation (particularly, feeling) for a change in the scroll speed is also increased.

In the present invention, preferably, the blurred picture is an image subjected to the blurring process in a scroll direction. In such a case, a transition from the low-speed scroll to the high-speed scroll and a transition from the high-speed scroll to the low-speed scroll are seen more natural. In addition, the realistic sensation (particularly, feeling) for a change in the scroll speed is also increased.

In the present invention, the processor adjusts speed of updating a part corresponding to a scroll region in a display image so that a first visual scroll speed becomes equal to or higher than a second visudal scroll speed. The first visual scroll speed is a scroll speed felt (confused) by the user at the time of high-speed scroll-displaying a display image made of a plurality of blurred pictures created through the blurring process, and is different from an actual scroll speed. The second visual scroll speed is a scroll speed felt (confused) by the user at the time of high-speed scroll-displaying a display image which is not subjected to the blurring process, and coincides with the actual scroll speed.

In such a case, the high-speed scroll can be performed with a small computation processing amount. It reduces the possibility that the high-speed scroll is disturbed due to the computation processing capability or the like. Consequently, the possibility that the transition from the low-speed scroll to the high-speed scroll and the transition from the high-speed scroll to the low-speed scroll become unnatural (unsmooth) is reduced.

In the present invention, preferably, in the case where a scroll request detected by the detector is a low-speed scroll request, the processor performs a process different from that in the high-speed scroll mode. For example, preferably, the processor employs a display image which is not subjected to the blurring process as a new picture required for a subsequent update of image displayed in a scroll region in a display image, thereby generating an image to be displayed. In such a case, the low-speed scroll is looked natural.

In the image processing apparatus, the image processing method, and the image processing program as embodiments of the present invention, the scroll speed (visual scroll speed) felt (confused) by the user is made higher than that in the case where all of display images are constructed by images which are not subjected to the blurring process. Further, the transition from the low-speed scroll to the high-speed scroll and the transition from the high-speed scroll to the low-speed scroll are made look more natural. Thus, natural scroll display and high-speed scroll are realized.

Other and further objects, features and advantages of the invention will appear more fully from the following description.

DETAILED DESCRIPTION OF THE PREFERRED EMBODIMENTS

Embodiments of the present invention will be described in detail below with reference to the drawings. Description will be given in the following order.

1. Embodiment
Schematic Configuration
Scrolling process
Effect
2. Modification

Embodiment

Configuration

Figure 1:
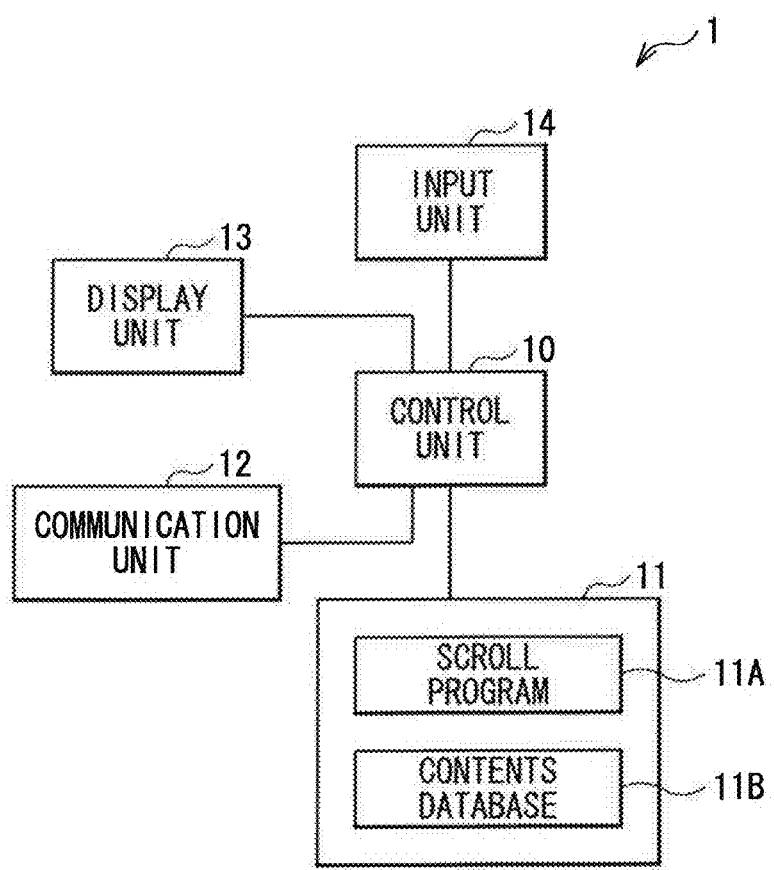
FIG. 1 is a schematic configuration diagram of an image processing apparatus according to an embodiment of the present invention.

FIG. 1 illustrates a schematic configuration of an image processing apparatus 1 according to an embodiment of the present invention. The image processing apparatus 1 has, for example, a control unit 10, a storage unit 11, a communication unit 12, a display unit 13, and an input unit 14. The control unit 10 is connected to, for example, the storage unit 11, the communication unit 12, the display unit 13, and the input unit 14.

The communication unit 12 and the display unit 13 may not be provided as necessary. For example, in the case where the communication unit 12 is provided, the display unit 13 may not be provided. In the case where the display unit 13 is provided, the communication unit 12 may not be provided. The display unit 13 may be provided separately from the image processing apparatus 1. In this case, the control unit 10 in the image processing apparatus 1 controls the display unit 13.

The input unit 14 is provided to enter information (for example, a scroll request) on execution of a program in the control unit 10 and includes, for example, a touch panel, a keyboard, a mouse, a sound microphone, and the like. The display unit 13 is provided to, for example, display an execution result (for example, scroll) of the program in the control unit 10 and support entry of information at the time of executing a program in the control unit 10. For example, the display unit 13 is a liquid crystal display, an organic EL display, or the like.

Figure 2:
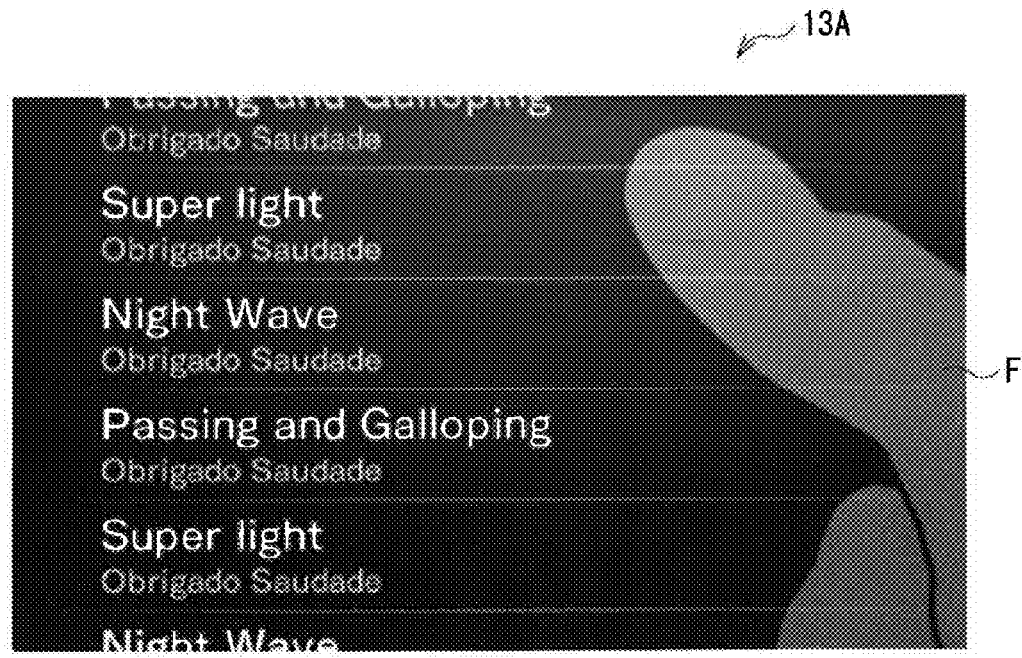
FIG. 2 is a diagram illustrating an example of a screen display during rest in the image processing apparatus of FIG. 1.

The control unit 10 is provided to interpret and execute a command of a program and includes, for example, a CPU (Central Processing Unit). In the storage unit 11, for example, a scroll program 11A and a contents database 11B are stored. The scroll program 11A may be constructed as hardware in the image processing apparatus 1. The control unit 10 displays, for example, all or a part of contents (not shown) stored in the contents database 11B in the storage unit 11 in a predetermined region on the screen (not shown) of the display unit 13. The "predetermined region" refers to a portion corresponding to a scroll region (for example, a region as illustrated in FIG. 2) which will be described later in the screen of the display unit 13.

The communication unit 12 can mutually communicate with another information processing apparatus (not shown) via a communication network (not shown). In the case where the communication unit 12 is provided in the image processing apparatus 1, the control unit 10 displays all or a part of the contents (not shown) stored in the contents database 11B in a predetermined region on the display screen (not shown) of an apparatus A via, for example, the communication unit 12 and the communication network according to an access from the information processing apparatus (apparatus A) on the communication network. The "predetermined region" refers to a portion corresponding to a scroll region (for example, a region as illustrated in FIG. 2) which will be described later in the display screen of the apparatus A.

The scroll program 11A is provided to perform a predetermined process (scrolling process) which will be described later, for example, in the case where all of the contents are not fit in the screen at the time of displaying a list of all or a part of the contents stored in the contents database 11B in the storage unit 11 onto the screen (not shown) of the display unit 13. The control unit 10 may start the scroll program 11A, for example, on power-on of the image processing apparatus 1 or at the stage when it is found that all of the contents are not fit in the screen as described above.

In the case where the communication unit 12 is provided in the image processing apparatus 1, the scroll program 11A is for performing, for example, a predetermined process (scrolling process) which will be described later in the case where all of the contents are not fit in the screen at the time of displaying a list of all or a part of the contents stored in the contents database 11B in the storage unit 11 onto the display screen (not shown) of the apparatus A on the communication network, which made an access via the communication unit 12 and the communication network. In this case as well, the control unit 10 may start the scroll program 11A, for example, on power-on of the image processing apparatus 1 or at the stage when it is found that all of the contents are not fit in the screen as described above.

When a scroll request from the user is made, the control unit 10 executes a scrolling process which will be described later in accordance with a code of the scroll program 11A. The scroll request from the user is supplied to, for example, the control unit 10 via the input unit 14. In the case where the communication unit 12 is provided in the image processing apparatus 1, the scroll request from the user is supplied, for example, from the apparatus A on the communication network to the control unit 10 via the communication unit 12 and the communication network.

Scrolling Process

Next, the scrolling process will be described in detail. In the following, the case where a part of the contents stored in the contents database 11B is displayed in a scroll region 13A in the screen of the display unit 13 will be described. However, the following description is also applied to the case where a part of the contents stored in the contents database 11B is displayed in a region (not shown) corresponding to the scroll region 13A in the screen of the apparatus A on the communication network. In this case, the input unit 14 mentioned as means for detecting a scroll request is changed to the control unit 10.

FIG. 2 illustrates an example of a state where an image is displayed in a stationary state in the scroll region 13A in the screen of the display unit 13. FIG. 2 illustrates the case where all or a part of contents read from the contents database 11B is displayed in a stationary state. FIG. 2 schematically shows a state where the user holds his/her finger F over the display screen in order to make the scroll request.

Figure 3:
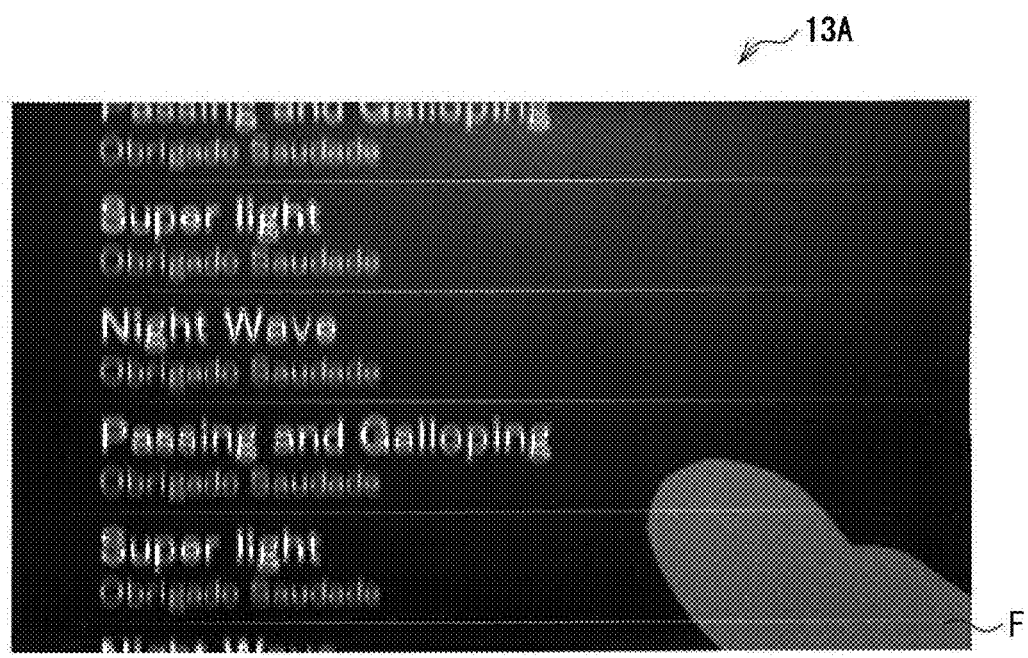
FIG. 3 is a diagram illustrating an example of a screen display in low-speed scroll mode in the image processing apparatus of FIG. 1.

FIG. 3 illustrates an example of a state where an image is displayed in a low-speed scroll state in the scroll region 13A in the screen of the display unit 13. FIG. 3 illustrates the case where all or a part of contents read from the contents database 11B is displayed in a stationary state. FIG. 3 schematically shows a state where the user slowly scrolls down on the display screen with his/her finger F.

Figure 4:
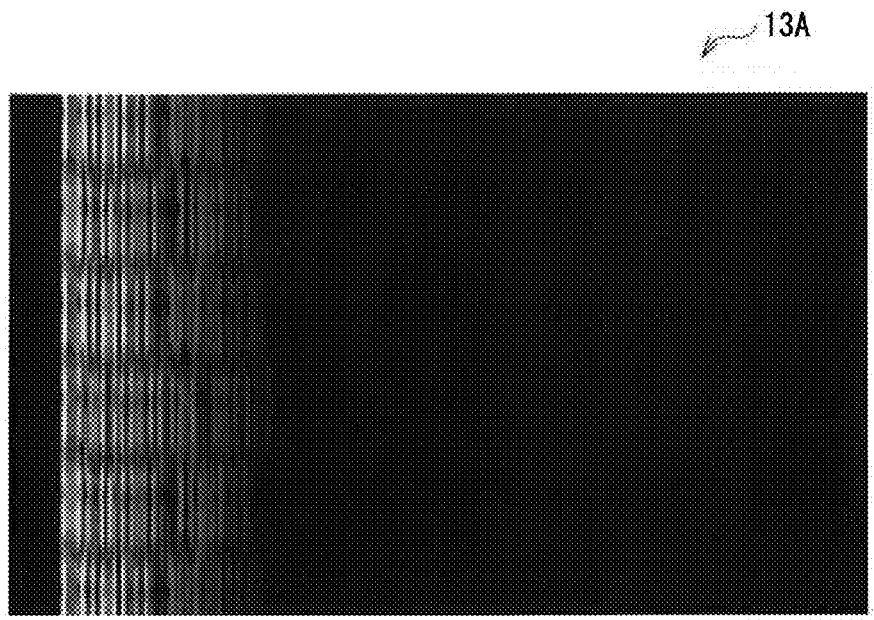
FIG. 4 is a diagram illustrating an example of a screen display in high-speed scroll mode in the image processing apparatus of FIG. 1.

FIG. 4 illustrates an example of a state where an image is displayed in a high-speed scroll state in the scroll region 13A in the screen of the display unit 13. FIG. 4 illustrates the case where, not the contents read from the contents database 11B, a plurality of blurred pictures which will be described later are displayed in the high-speed scroll state. FIG. 4 shows a state where the user scrolls down quickly on the display screen with his/her finger F, and the finger F is already away from the display screen (so that the finger F is not shown in FIG. 4).

The stationary state refers to a state where no image is scrolled and the image in the scroll region 13A is not updated (not changed). The low-speed scroll state denotes a state where the image is scrolled slowly enough for the user to make out characters and an image in the scroll region 13A on the screen, and the image is updated (changed) in the scroll region 13A in a slow cycle. The high-speed scroll state usually denotes a state where the image is scrolled too fast for the user to make out characters and an image in the scroll region 13A on the screen, and the image is updated (changed) in the scroll region 13A in a fast cycle. However, in the embodiment, the high-speed scroll state refers to a state where an image is visually scrolled at high speed. In other words, the high-speed scroll state in the embodiment is similar to the normal high-speed scroll state with respect to the point that the user cannot make out characters and an image in the scroll region 13A on the screen. However, the high-speed scroll state of the embodiment differs from the normal high-speed scroll state with respect to the point that the image is updated in the scroll region 13A in a cycle equal to or slightly higher than that in the low-speed scroll state.

When no scroll request is sent from the user or the low-speed scroll request is sent as the scroll request from the user, preferably, the control unit 10 performs a process different from that in the high-speed scroll state, which is described in detail below. In such a case, the low-speed scroll is seemed natural.

Stationary State

Concretely, when no scroll request is made by the user, the control unit 10 outputs a video signal to the display unit 13 in predetermined cycles without updating the image in the scroll region 13A to display the image in the display unit 13. At this time, at least the image in the scroll region 13A remains stationary (refer to FIG. 2). The control unit 10 displays all or a part of the contents read from the contents database 11B as the image in the scroll region 13A.

Low-Speed Scroll

When a low-speed scroll request is made as a scroll request by the user, the control unit 10 updates the image in the scroll region 13A in a slow cycle, and outputs the video signal to the display unit 13 in a predetermined cycle to display the image in the display unit 13. At this time, at least the image in the scroll region 13A is updated in the slow cycle (refer to FIG. 3). The control unit 10 employs a display image which is not subjected to blurring process as a new picture required for a subsequent update of image displayed in the scroll region 13A in the display image in low-speed scroll mode, thereby generating an image to be displayed. Although FIG. 3 illustrates a state where the image displayed in the scroll region 13A is blurred, the blur in the image occurs due to the display performance of the display unit 13 or the like, and the blurring process is not performed on the image. In low-speed scroll mode, an image which is slightly blurred may be used as necessary. A method of displaying a blurred picture conforms to a display method in high-speed scroll mode which will be described later.

A display image which is not subjected to the blurring process is, for example, an image of contents (for example, the title of a music piece and the name of a singer) read from the contents database 11B. The blurring process is a process of blurring a portion where the contrast difference is large in an image to make a change in contrast smaller. In the embodiment, as the blurring process, for example, a process of largely blurring an image in one direction and performing no blurring or slightly blurring an image in a direction orthogonal to the largely blurring direction is employed (refer to FIG. 4). The largely blurring direction is preferably parallel to the scroll direction. Therefore, in the case where the largely blurring direction is parallel to the scroll direction, the image subjected to the blurring process (blurred picture) is an image subjected to the blurring process in the scroll direction. In high-speed scroll mode, it is preferable to use the image subjected to the blurring process in the scroll direction as a blurred picture. The reason why such a blurred picture is preferable will be described in detail later.

High-Speed Scroll

When a high-speed scroll request is made as a scroll request by the user, the control unit 10 updates the image in the scroll region 13A in a fast cycle, and outputs the video signal to the display unit 13 in a predetermined cycle to display the image in the display unit 13. At this time, at least the image in the scroll region 13A is updated in the fast cycle. The control unit 10 employs a blurred picture which is created through blurring process as a new picture required for a subsequent update of image displayed in the scroll region 13A in the display image in high-speed scroll mode, thereby generating an image to be displayed.

The blurred picture which is created through the blurring process is, for example, an image of contents (for example, the title of a music piece and the name of a singer) read from the contents database 11B, which is subjected to the blurring process. The blurred picture is created by, for example, using a part of the image displayed in the scroll region 13A in the stationary state or in low-speed scroll mode. Preferably, the blurred picture is a display image in the stationary state or in low-speed scroll mode and created by using a part of the image displayed in the scroll region 13A just before the high-speed scroll. In such a case, more natural scroll display is realized.

For example, in the case where the blurring process is performed mainly in the direction parallel to the scroll direction as illustrated in FIG. 4, a transition from the low-speed scroll to the high-speed scroll and a transition from the high-speed scroll to the low-speed scroll are seen more natural. It is more understandable when a state of transition of the scroll region 13A from the screen illustrated in FIG. 3 to the screen illustrated in FIG. 4 is assumed. The blurring process produces not only an effect of natural scrolling but also an effect of enhancing realistic sensation (particularly, feeling) for a change in the scroll speed. Actually, the realistic sensation is one of important factors for increasing the commercial value, and the blurring process is important also from the viewpoint of enhancing the realistic sensation.

Preferably, for example, the control unit 10 adjusts the speed of updating a part corresponding to the scroll region 13 in the display image so that a first visual scroll speed becomes equal to or higher than a second visual scroll speed.

The first visual scroll speed is a scroll speed felt (confused) by the user when a display image made by a plurality of blurred pictures created through the blurring process is displayed in the high-speed scroll mode. Therefore, the first visual scroll speed is different from the actual scroll speed. The second visual scroll speed is a scroll speed felt by the user when a display image which is not subjected to the blurring process is displayed in the high-speed scroll mode. Therefore, the second visual scroll speed coincides with the actual scroll speed.

In the embodiment, in the case where the speed of updating the part corresponding to the scroll region 13 in the display image is set as described above, the high-speed scroll can be performed with a small computation process amount. It reduces the possibility that the high-speed scroll is disturbed due to the computation processing capability or the like. Consequently, the possibility that the transition from the low-speed scroll to the high-speed scroll and the transition from the high-speed scroll to the low-speed scroll become unnatural (become unsmooth) is reduced.

After recognizing that the scroll request detected by the input unit 14 is the high-speed scroll request, the control unit 10 may create a blurred picture. In this case, the control unit 10 employs the generated blurred picture as a new picture required for a subsequent update of image displayed in the scroll region 13A in the display image, thereby generating an image to be displayed. In such a case, the transition from the low-speed scroll to the high-speed scroll and the transition from the high-speed scroll to the low-speed scroll are seen more natural.

The control unit 10 may preliminarily store the blurred picture in the storage unit 11. In this case, when the scroll request detected by the input unit 14 is the high-speed scroll request, first, the control unit 10 reads the blurred picture from the storage unit 11. Subsequently, the control unit 10 employs the read blurred picture as a new picture required for a subsequent update of image displayed in the scroll region in the display image, thereby generating an image to be displayed. In such a case, the computation process amount at the start of the high-speed scroll is suppressed, so that quick transition to the high-speed scroll is realized. As a result, the possibility that the transition from the low-speed scroll to the high-speed scroll and the transition from the high-speed scroll to the low-speed scroll become unnatural (become unsmooth) is reduced.

Effect

In the embodiment, in high-speed scroll mode, the blurred picture created through the blurring process is employed as a new picture required for a subsequent update of image displayed in the scroll region 13A in the display image. It makes the scroll speed (visual scroll speed) felt (confused) by the user higher than that in the case where all of display images are images which are not subjected to the blurring process. In high-speed scroll mode, the user cannot clearly visually make out the image which is not subjected to the blurring process, and sees the image which is not subjected to the blurring process as a blurred picture. Consequently, for example, when the display image which is not subjected to the blurring process changes to the display image including the image subjected to the blurring process and, further, changes to the display image made only by the image subjected to the blurring process, the display image does not look unnatural. For example, on the contrary, also when the display image made only by the image subjected to the blurring process changes to the display image including the image which is subjected to the blurring process and, further, changes to the display image which is not subjected to the blurring process, the display image does not look unnatural. Rather, the transition from the low-speed scroll to the high-speed scroll and the transition from the high-speed scroll to the low-speed scroll look more natural. In addition, the realistic sensation (particularly, feeling) for a change in the scroll speed is also increased. Therefore, the image processing apparatus 1 of the embodiment realizes the natural scroll display and the high-speed scroll.

Figure 5:
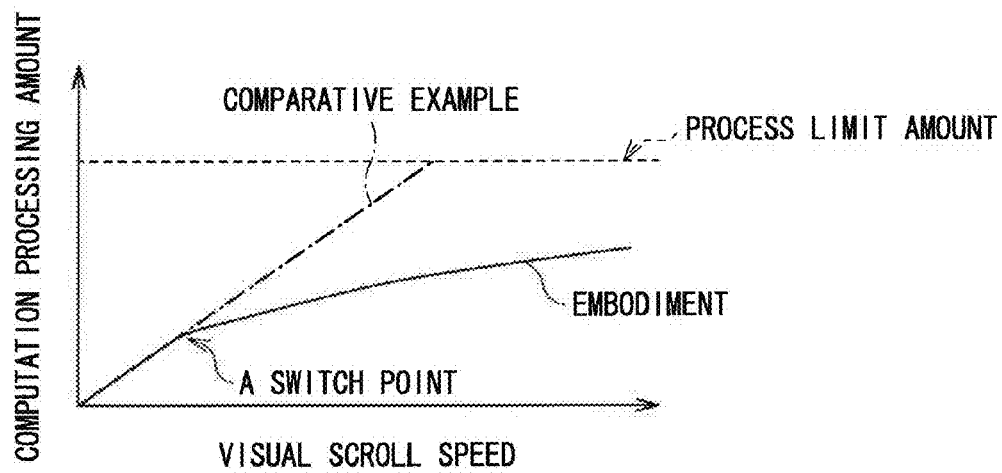
FIG. 5 is a diagram illustrating an example of the relation between visual scroll speed and an arithmetic processing amount.

In the embodiment, in the case where the speed of updating the part corresponding to the scroll region 13A in the display image is adjusted so that the first visual scroll speed becomes equal to or higher than the second visual scroll speed, the high-speed scroll is performed with the small computation processing amount. For example, as shown by the solid line in FIG. 5, the visual scroll speed can be increased without reaching the process limit amount of the image processing apparatus 1. On the other hand, in a comparative example of performing a scroll without using the blurring technique, it is understood that the process amount reaches the process limit amount of the image processing apparatus 1 and the limit exists in the scroll speed. Therefore, in the embodiment, the scroll speed does not depend on the computation processing capability and the like, so that demands of the user at present for the scroll display and the high-speed scroll are sufficiently satisfied.

Modifications

Figure 6:
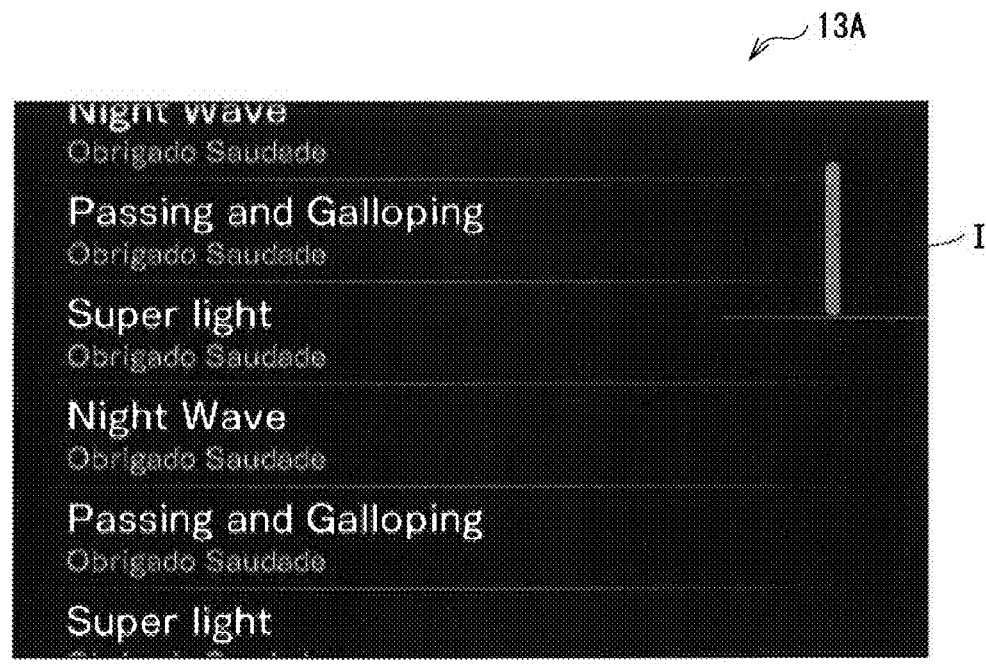
FIG. 6 is a diagram illustrating another example of a screen display during rest in the image processing apparatus of FIG. 1.
Figure 7:
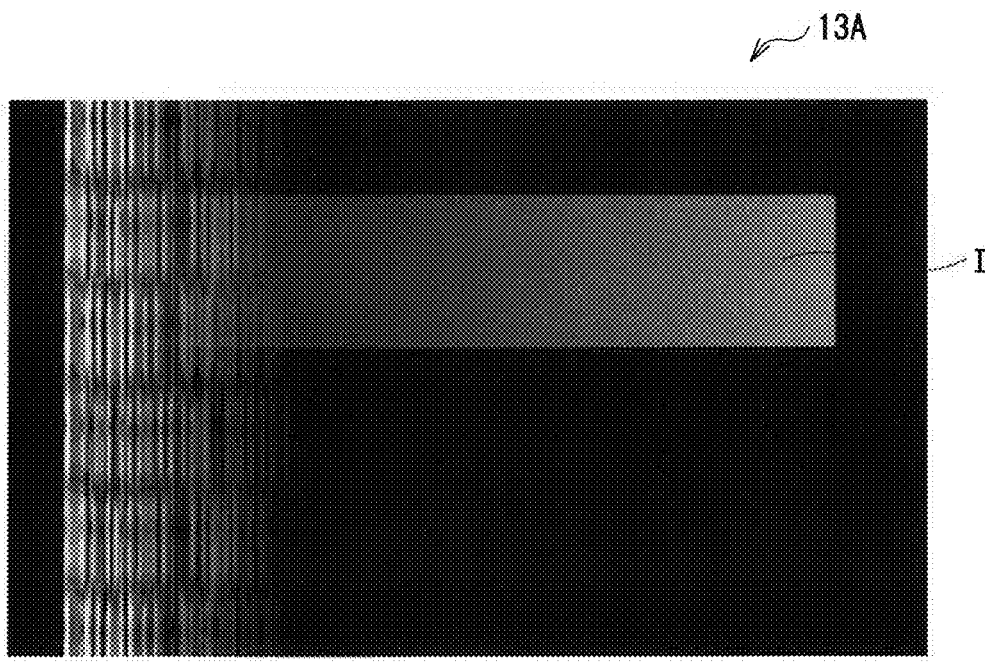
FIG. 7 is a diagram illustrating another example of a screen display in high-speed scroll mode in the image processing apparatus of FIG. 1.

In the foregoing embodiment, the control unit 10 may display, for example, an indicator I in a display image as illustrated in FIG. 6. In this case, preferably, the control unit 10 changes the display area of the indicator in accordance with the scroll speed. Preferably, for example, as illustrated in FIG. 7, the control unit 10 makes the indicator I extend in the direction orthogonal to the scroll direction so as to cover a part of the scroll region 13A in accordance with the scroll speed. In such a case, the user pays attention to the indicator I in high-speed scroll mode and does not watch a blurred picture displayed in the scroll region 13A so much. As a result, the high-speed scroll is looked more natural.

The extension of the indicator I is realized by, for example, as illustrated in FIG. 7, changing the degree of gradation of the indicator I.

In the foregoing embodiment, the control unit 10 may output a scroll sound from a speaker (not shown) while a display image is scrolled and change the volume or tone of the scroll sound in accordance with the scroll speed. For example, preferably, the control unit 10 decreases the scroll sound as the scroll speed increases. In such a case, the scroll sound does not become noise to the user, and comfortable scroll is realized.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a detector to detect a scroll request; and
   a processor, when the detector detects a high-speed scroll request, to employ a plurality of blurred pictures created through a blurring process as an image to be displayed in a scroll region,
   wherein the processor, when the detector detects the high-speed scroll request, adjusts update speed of the image displayed in the scroll region so that a scroll speed of the plurality of blurred pictures which form the image is equal to or higher than an actual scroll speed, and
   wherein the processor displays an indicator in a portion of the scroll region having the blurred pictures displayed as the image so as to cover a part of the image and causes a size of the indicator to change in accordance with the scroll speed so as to expand or contract in a direction orthogonal to a scroll direction in accordance with the scroll speed.

2. The image processing apparatus according to claim 1, wherein the blurred pictures are blurred along a scroll direction.

3. The image processing apparatus according to claim 1, wherein the processor, when the detector detects a low-speed scroll request, employs a non-blurred picture as the image to be displayed in the scroll region.

4. The image processing apparatus according to claim 3, wherein the blurred pictures are created with use of a part of a still picture or a picture used in low-speed scroll mode.

5. The image processing apparatus according to claim 4, wherein the blurred pictures are created with use of a part of a still picture or a picture used in low-speed scroll mode, which is displayed just before entering high-speed scroll mode.

6. The image processing apparatus according to claim 5, wherein the processor, when the detector detects the high-speed scroll request, creates the blurred pictures thereafter.

7. The image processing apparatus according to claim 1, further comprising a storage unit storing the blurred picture,
   wherein the processor, when the detector detects the high-speed scroll request, reads the blurred pictures from the storage unit.

8. The image processing apparatus according to claim 1, wherein the processor performs expansion or contraction of the indicator through changing the gradation thereof.

9. The image processing apparatus according to claim 1, wherein the processor allows a speaker to output scroll sound while the displayed image is scrolled, and adjusts volume or tone of the scroll sound in accordance with scroll speed.

10. The image processing apparatus according to claim 1, wherein the processor displays the generated image to be displayed.

11. The image processing apparatus according to claim 10, further comprising a display panel for displaying the generated image to be displayed.

12. An image processing method comprising:
    detecting a scroll request;
    employing, when a high-speed scroll request is detected, a plurality of blurred pictures created through a blurring process as an image to be displayed in a scroll region;
    adjusting, when the high-speed scroll request is detected, update speed of the image displayed in the scroll region so that a scroll speed of the plurality of blurred pictures which form the image is equal to or higher than an actual scroll speed, and
    displaying an indicator in a portion of the scroll region having the blurred pictures displayed as the image so as to cover a part of the image and causing a size of the indicator to change in accordance with the scroll speed so as to expand or contract in a direction orthogonal to a scroll direction in accordance with the scroll speed.

13. A non-transitory storing medium on which an image processing program is stored, the program allowing a computer to perform procedures of:
    detecting a scroll request;
    employing, when a high-speed scroll request is detected, a plurality of blurred pictures created through a blurring process as an image to be displayed in a scroll region;
    adjusting, when the high-speed scroll request is detected, update speed of the image displayed in the scroll region so that a scroll speed of the plurality of blurred pictures which form the image is equal to or higher than an actual scroll speed, and
    displaying an indicator in a portion of the scroll region having the blurred pictures displayed as the image so as to cover a part of the image and causing a size of the indicator to change in accordance with the scroll speed so as to expand or contract in a direction orthogonal to a scroll direction in accordance with the scroll speed.

* * * * *